United States Patent
Falconetti et al.

(10) Patent No.: US 9,839,048 B2
(45) Date of Patent: Dec. 5, 2017

(54) CONTROL CHANNEL QUALITY BASED SCHEDULING OF RADIO TRANSMISSIONS

(71) Applicant: TELEFONAKTIEBOLAGET L M ERICSSON (PUBL), Stockholm (SE)

(72) Inventors: Laetitia Falconetti, Aachen (DE); Jörg Huschke, Aachen (DE); Kristina Jersenius, Linköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 98 days.

(21) Appl. No.: 14/773,010

(22) PCT Filed: Mar. 4, 2013

(86) PCT No.: PCT/EP2013/054285
§ 371 (c)(1),
(2) Date: Sep. 4, 2015

(87) PCT Pub. No.: WO2014/135193
PCT Pub. Date: Sep. 12, 2014

(65) Prior Publication Data
US 2016/0014800 A1   Jan. 14, 2016

(51) Int. Cl.
*H04W 72/12* (2009.01)
*H04W 24/10* (2009.01)

(52) U.S. Cl.
CPC ....... *H04W 72/1231* (2013.01); *H04W 24/10* (2013.01); *H04W 72/1289* (2013.01)

(58) Field of Classification Search
None
See application file for complete search history.

(56) References Cited

U.S. PATENT DOCUMENTS

2003/0073409 A1* 4/2003 Nobukiyo ............. H04W 24/10
455/67.11
2007/0189199 A1* 8/2007 Nishio ..................... H04L 5/023
370/328
(Continued)

FOREIGN PATENT DOCUMENTS

EP   1207714 A1   5/2002
EP   1724949 A1   11/2006
(Continued)

OTHER PUBLICATIONS

Notification of Transmittal of the International Search Report and Written Opinion dated Dec. 17, 2013, in International Application No. PCT/EP2013/054285, 12 pages.
(Continued)

*Primary Examiner* — Kodzovi Acolatse
(74) *Attorney, Agent, or Firm* — Patent Portfolio Builders, PLLC

(57) ABSTRACT

Control channel quality based scheduling of radio transmissions For controlling radio transmission in a mobile network, a node (100) of the mobile network determines a channel quality of a downlink control channel of a cell (10) of the mobile network, as experienced by a certain user equipment (50-1) in the cell (10). Depending on the determined channel quality of the downlink control channel, the node (100) schedules at least one radio transmission on a data channel of the cell (10). On the downlink control channel, the node (100) indicates radio resources allocated for the scheduled at least one radio transmission.

29 Claims, 12 Drawing Sheets

(56) References Cited

U.S. PATENT DOCUMENTS

| | | | | |
|---|---|---|---|---|
| 2007/0274343 | A1* | 11/2007 | Nishio | H04W 72/082 |
| | | | | 370/479 |
| 2011/0216682 | A1* | 9/2011 | Xu | H04L 1/0027 |
| | | | | 370/311 |
| 2012/0069756 | A1 | 3/2012 | Ji et al. | |
| 2012/0113816 | A1* | 5/2012 | Bhattad | H04L 5/0032 |
| | | | | 370/246 |
| 2012/0122508 | A1* | 5/2012 | Nakayama | H04L 5/0044 |
| | | | | 455/513 |
| 2012/0314665 | A1 | 12/2012 | Ishida et al. | |
| 2013/0072212 | A1* | 3/2013 | Nakamura | H04W 16/08 |
| | | | | 455/452.1 |

FOREIGN PATENT DOCUMENTS

| | | |
|---|---|---|
| GB | 2486926 A | 7/2012 |
| WO | 2010071500 A1 | 6/2010 |
| WO | 2011085195 A1 | 7/2011 |

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.2.0, 2012, 340 pages.
Motorola "Frequency Domain Scheduling for E-UTRA" 3GPP TSG RAN1#44bis, R1-060877, 2006, 7 pages.

\* cited by examiner

CONTROL CHANNEL QUALITY BASED SCHEDULING OF RADIO TRANSMISSIONS

CROSS REFERENCE TO RELATED APPLICATION(S)

This application is a 35 U.S.C. §371 National Phase Entry Application from PCT/EP2013/054285, filed Mar. 4, 2013, designating the United States, the disclosure of which is incorporated herein in its entirety by reference.

TECHNICAL FIELD

The present invention relates to methods for controlling radio transmission in a mobile network and to corresponding devices.

BACKGROUND

Radio transmission in a mobile network may be subject to various types of impairment. For example, downlink (DL) radio transmissions to a user equipment (UE) in a cell of the mobile network may be subject to interference from DL radio transmissions in another cell. By way of example, such problems may arise when utilizing a heterogeneous deployment with high power base stations, also referred to as macro base stations, and low power base stations, also referred to as pico base stations. In such heterogeneous deployment, a conventional cell association mechanism which is based on DL received signal strength typically results in a limited coverage area of the pico base stations. The coverage area may however be extended by adding a bias to the DL received signal strength of a pico base station as measured by the UEs, and using the biased DL received signal strength in the cell association mechanism. This has the effect that also UEs near the cell border, which measure a lower DL received signal strength, will be associated with the cell so that the cell coverage area is extended. However, this may also have the effect that certain UEs experience a negative (on the logarithmic scale) Signal-to-Interference/Noise Ratio (SINR). In particular, the added bias may have the effect that a UE is associated with the pico base station, but the DL received signal strength from a macro base station is larger than the measured (unbiased) DL received signal strength of the pico base station. The interference from the macro base station is thus larger than the useful radio signal from the pico base station. The interference may affect both a data channel of the cell and a control channel of the pico base station's cell.

The negative SINR may thus cause failure of radio transmissions on the control channel. Such failures may adversely affect the overall performance of the cell. For example, the control channel may be used to indicate scheduling decisions of the network to the UEs in the cell. A radio transmission on the control channel may then for example indicate radio resources of the data channel in which a DL radio transmission to the UE is scheduled. However, a failure of the radio transmission on the control channel, which indicates the radio resources, will then have the effect that the DL radio transmission on the data channel cannot be received by the UE and will fail as well. The scheduled resources are therefore wasted.

To address the above interference problems, techniques for interference protection may be used. For example in mobile networks using LTE (Long Term Evolution) radio access technology specified by 3GPP ($3^{rd}$ Generation Partnership Project), certain resources may be protected from interference by defining an Almost Blank Subframes (ABSs). In an ABS, the macro base station does not transmit any data, but typically only Cell Specific Reference Symbols (CRSs) and possibly some control information. The ABS may then be used for low-interference radio transmissions to the UEs in the cell of the pico base station. As an alternative to ABSs, also Reduced Power Subframes (RPSs) may be used, in which the macro base stations transmit at a reduced power level, thereby reducing the interference to the cell of the pico base station.

The utilization of ABSs and/or RPSs needs to be taken into account in the scheduling mechanism implemented at the pico base station. For example, the scheduling mechanism may first determine a set of UEs suffering from a negative SINR due to the interference from the macro base station(s), using the DL received signal strength reported by the UEs in the cell, and use exclusively resources from the ABSs for scheduling radio transmission of these UEs. This may degrade the performance experienced by these UEs, e.g., because the ABSs offer only limited resources, which may be insufficient to meet the demand of certain UEs. That is to say, while negative effects due to interference may be avoided by using ABSs or RPSs, this may come at the cost of degraded performance due to limited resources. Known scheduling algorithms, for example based on a channel quality of the data channel as described in "Frequency Domain Scheduling for E-UTRA", submitted as document R1-060877 for 3GPP RAN1 meeting #44 bis (Athens, Greece, Mar. 27-31, 2006), are not suitable to address such issues.

Accordingly, there is a need for techniques which allow for efficiently controlling radio transmissions in a mobile network.

SUMMARY

According to an embodiment of the invention, a method of controlling radio transmission in a mobile network is provided. According to the method, a node of the mobile network determines a channel quality of a DL control channel of a cell of the mobile network. This is accomplished for a certain UE in the cell or individually for multiple UEs in the cell. Depending on the determined channel quality of the DL control channel, the node schedules at least one radio transmission on a data channel of the cell. On the downlink control channel, the node indicates radio resources allocated for the scheduled at least one radio transmission.

According to a further embodiment of the invention, a method of controlling radio transmission in a mobile network is provided. According to the method, a node of the mobile network determines control channel utilization information. The control channel utilization information indicates utilization of a DL control channel of a cell of the mobile network. The node sending the control channel utilization information to a further node which is responsible for scheduling of radio transmissions on a data channel of a further cell of the mobile network.

According to a further embodiment of the invention, a method of controlling radio transmission in a mobile network is provided. According to the method, a UE determines a channel quality of a DL control channel of a cell of the mobile network. The UE sends a measurement report indicating the determined channel quality of the DL control channel to a node which is responsible for scheduling of radio transmissions on a data channel of the cell.

According to a further embodiment of the invention, a node for a mobile network is provided. The node comprises at least one interface and at least one processor. The at least one processor is configured to determine, for a UE in a cell of the mobile network, a channel quality of a DL control channel of the cell. Further, the at least one processor is configured to schedule, depending on the determined channel quality of the DL control channel, at least one radio transmission on a data channel of the cell. Further, the at least one processor is configured to indicate, via the at least one interface, radio resources for the scheduled at least one radio transmission on the data channel.

According to a further embodiment of the invention, a node for a mobile network is provided. The node comprises at least one interface and at least one processor. The at least one processor is configured to determine control channel utilization information. The control channel utilization information indicates utilization of a DL control channel of a cell of the mobile network. Further, the at least one processor is configured to send the control channel utilization information via the at least one interface to a further node which is responsible for scheduling of radio transmissions on a data channel of a further cell of the mobile network.

According to a further embodiment of the invention, a UE for a mobile network is provided. The UE comprises a radio interface and at least one processor. The at least one processor is configured to determine a channel quality of a DL control channel of a cell of the mobile network. Further, the at least one processor is configured to send, via the radio interface, a measurement report indicating the determined channel quality of the DL control channel to a node which is responsible for scheduling of radio transmissions on a data channel of the cell.

According to a further embodiment of the invention, a computer program product comprising program code to be executed by at least one processor of a node of a mobile network is provided. Execution of the program code causes the node to determine, for a user equipment in a cell of the mobile network, a channel quality of a DL control channel of the cell. Further, execution of the program code causes the node to schedule, depending on the determined channel quality of the DL control channel, at least one radio transmission on a data channel of the cell. Further, execution of the program code causes the node to indicate radio resources allocated for the scheduled at least one radio transmission.

According to a further embodiment of the invention, a computer program product comprising program code to be executed by at least one processor of a node of a mobile network is provided. Execution of the program code causes the node to determine control channel utilization information. The control channel utilization information indicates utilization of a DL control channel of a cell of the mobile network. Further, execution of the program code causes the node to send the control channel utilization information to a further node which is responsible for scheduling of radio transmissions on a data channel of a further cell of the mobile network.

According to a further embodiment of the invention, a computer program product comprising program code to be executed by at least one processor of a UE for is provided. Execution of the program code causes the UE to determine a channel quality of a DL control channel of a cell of the mobile network. Further, execution of the program code causes the UE to send a measurement report to a node which is responsible for scheduling of radio transmissions on a data channel of the cell. The measurement report indicates the determined channel quality of the downlink control channel.

DETAILED DESCRIPTION OF EMBODIMENTS

In the following, concepts in accordance with exemplary embodiments of the invention will be explained in more detail and with reference to the accompanying drawings. The illustrated embodiments relate to concepts for controlling radio transmission in a mobile network. The embodiments specifically refer to a scenario using LTE radio access technology and a heterogeneous network deployment. In particular, it is assumed that the concepts are applied for controlling radio transmission in a cell served by a pico base station, and that certain UEs in the cell may be affected by interference from a neighboring macro base station, e.g., due to utilizing a cell association mechanism which is based on a DL received signal power measured by the UEs with an added bias to extend the coverage area of the cell. However, it should be understood that the concepts could also be applied in connection with other deployments, e.g., homogeneous deployments using multiple base stations of substantially the same power, or other radio access technologies, e.g., Universal Mobile Telecommunications System (UMTS) radio access technology. Still further, the concepts may also be applied to address various types of interference experienced by a certain UE.

According to the illustrated concepts, scheduling of radio transmissions on a data channel of the cell is performed depending on a channel quality of a DL control channel (DL CCH) of the cell as experienced by a certain UE. In accordance with the illustrated LTE scenario, the DL control channel may be a Physical DL Control Channel (PDCCH), and the data channel may be a Physical DL Shared Channel (PDSCH) or a Physical UL Shared Channel (PUSCH). By taking into account the channel quality of the DL CCH, the scheduling mechanism may accurately take into account the failure risk when using the DL CCH to indicate a scheduling decision to the UE. This may for example help to better achieve a certain scheduling goal, such as fairness among multiple UEs. Namely, because a failure when indicating the scheduling decision on the DL CCH also causes failure of the scheduled radio transmission on the data channel and typically a retransmission, the resources available to other UEs may be unduly limited. This may be addressed by lowering the scheduling priority of a UE experiencing a low channel quality of the DL CCH. Further, the channel quality of the DL CCH may also be used to decide whether to schedule the UE in protected radio resources, e.g., ABS or RPS, or in unprotected radio resources, e.g., usual subframes also utilized by a neighboring macro base station for transmission of data. In this way, the number of UEs which need to be scheduled in protected radio resources can be adapted to the actually experienced interference on the DL CCH. In other words, the size of the group of UEs which are schedulable in unprotected radio resources can be flexibly adjusted.

Figure 1:
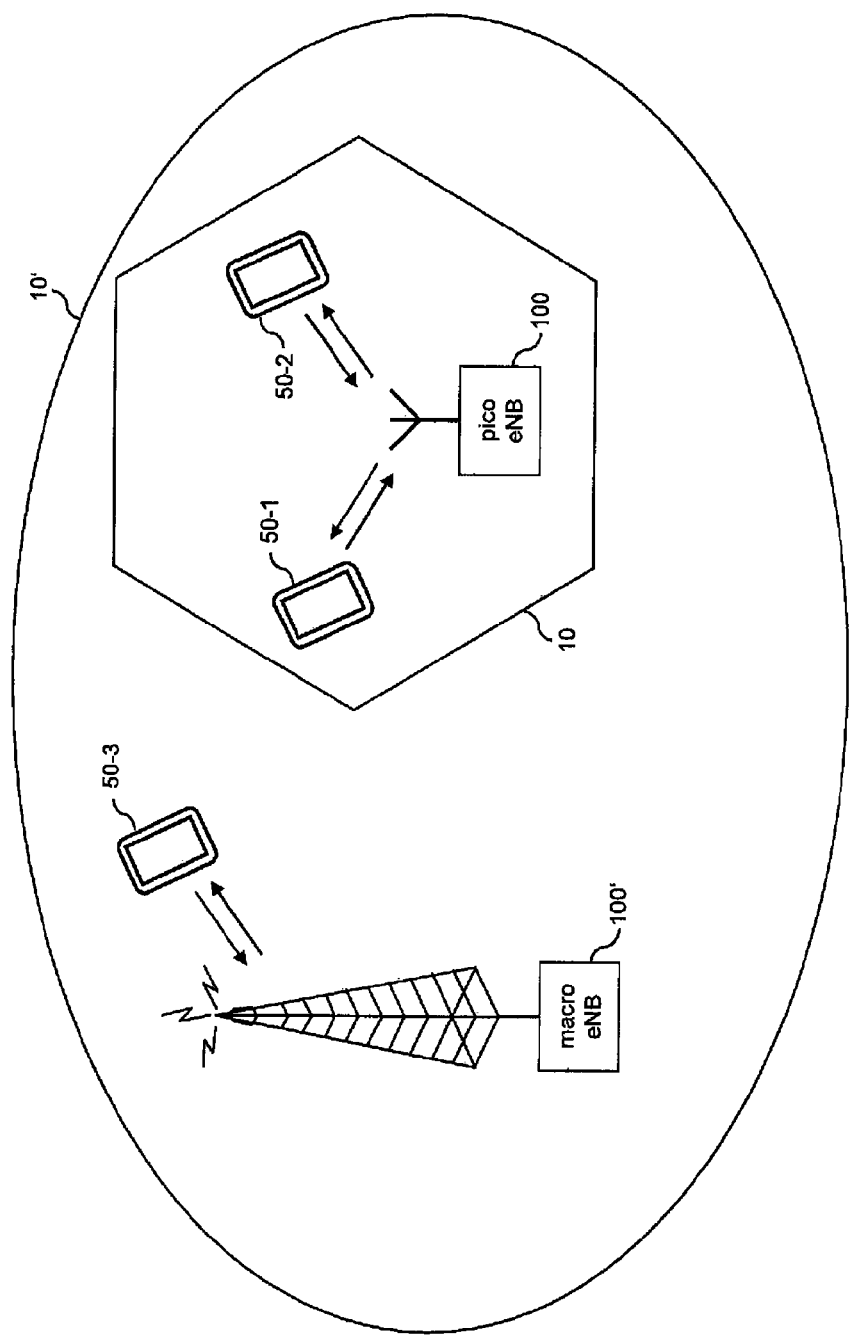
FIG. 1 schematically illustrates a heterogeneous network deployment in which radio transmission control according to an embodiment of the invention may be applied.

FIG. 1 schematically illustrates an exemplary scenario in which the concepts may be applied. In particular, FIG. 1 illustrates a cell 10 of the mobile network, which is served by a pico base station 100, and a further cell 10' of the mobile network, which is served by a macro base station 100'. In accordance with the illustrated LTE scenario, the pico base station 100 and the macro base station 100' are each implemented as an evolved Node B (eNB). Further, FIG. 1 also illustrates UEs 50-1, 50-2 in the cell 10 and a UE 50-3 in the further cell 10'. Radio transmissions between the mobile network and the UEs 50-1 and 50-2 are handled by the pico base station 100. Radio transmissions between the mobile network and the UE 50-3 are handled by the macro base station 100'.

The cell 10 provides a DL CCH for conveying DL control information from the pico base station 100 to the UEs 50-1, 50-2, and a data channel for carrying data transmitted between the pico base station 100 and the UEs 50-1, 50-2. In accordance with the illustrated LTE scenario, the data channel is assumed to be shared by the UEs 50-1,50-2, with radio resources of the data channel, e.g., resource elements of a time/frequency grid, being dynamically allocated to the UEs 50-1, 50-2 when scheduling radio transmissions on the data channel. The allocated resources are indicated to the UEs 50-1, 50-2 by sending scheduling information on the DL CCH. The data channel may include a DL data channel, e.g., the PDSCH, and an UL data channel, e.g., the PUSCH. Scheduling information indicating allocated resources for transmission on the DL data channel, i.e., to the UE 50-1, 50-2, may also be referred to as DL assignment. Scheduling information indicating allocated resources for transmission on the UL data channel, i.e., to the UE 50-1, 50-2, may also be referred to as UL grant. Further, the cell 10' may also provide an UL control channel (UL CCH) for conveying UL control information from the UEs 50-1, 50-2 to the pico base station 100. The UL control information may for example include feedback messages for positively or negatively acknowledging receipt of data on the data channel. In the illustrated LTE scenario, the UL CCH may be implemented as Physical UL Control Channel (PUCCH). In a similar way, the further cell 10' provides a DL CCH for conveying DL control information to the UE 50-3, a data channel for carrying data transmitted between the macro base station 100' and the UE 50-3, and also an UL CCH for conveying UL control information from the UE 50-3 to the macro base station 100'.

In the scenario of FIG. 1, for example the UE 50-1 may experience interference from the further cell 10'. For example, the UE 50-1 may have been associated with the cell 10 due to biasing the DL received signal strength measured from the pico base station 100, although the actually observed DL received signal strength from the macro base station 100' is larger than the actually observed DL received signal strength from the pico base station 100. This may result in low SINR experienced by the UE 50-1. The situation may be different for the UE 50-2, which may experience less interference from the further cell 10'.

In accordance with the illustrated concepts, this may be taken into account by determining the channel quality of the DL CCH as experienced by the UE 50-1. The scheduling mechanism implemented at the pico base station 100 may then perform the scheduling depending on the determined quality of the DL CCH. In some scenarios, a similar determination may also be performed for the UE 50-2, thereby allowing to consider the channel qualities of the DL CCH in relation to each other. The assumed lower channel quality of the DL CCH experienced by the UE 50-1 may cause the scheduling mechanism to schedule the UE 50-1 with a lower priority than the UE 50-2. Alternatively, the scheduling mechanism may also decide to schedule the UE 50-1 in protected radio resources, while the UE 50-2 may be scheduled in unprotected radio resources.

In the following, options for determining the channel quality of the DL CCH will be explained in more detail.

According to one option, the channel quality of the DL CCH may be determined from feedback messages from the UE 50-1. By such feedback messages, the UE 50-1 may positively (as ACK) or negatively acknowledge (as NACK) receipt of a radio transmission on the data channel. The feedback messages may be transmitted in accordance with a Hybrid Automatic Repeat Request (HARQ) protocol, such as specified for the LTE radio access technology. Exemplary processes involving such feedback messages are illustrated in FIG. 2.

Figure 2:
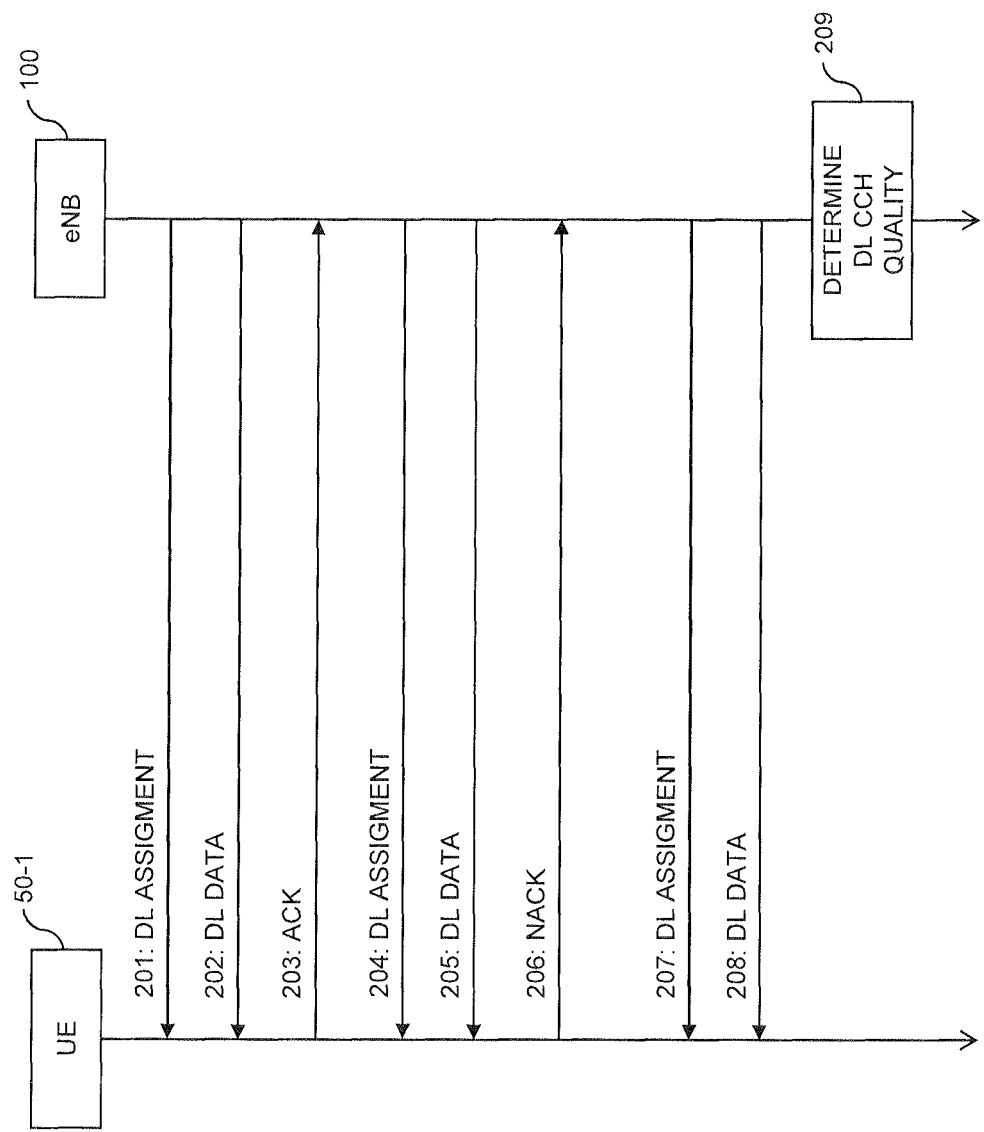
FIG. 2 shows a signalling diagram for illustrating processes according to embodiments of the invention, which may be applied for determining a channel quality of a DL control channel from feedback messages sent by a UE.

As illustrated in FIG. 2, the pico base station 100 may send a DL assignment 201 on the DL CCH to the UE 50-1. The DL assignment 201 indicates allocated resources for a radio transmission 202 on the DL data channel. The pico base station 100 then proceeds with sending the radio transmission 202 on the DL data channel. Upon receiving and successfully decoding the radio transmission 202, the UE 50-1 sends an ACK 203 to the pico base station 100. For this purpose, the UL CCH may be used.

As further illustrated in FIG. 2, the pico base station 100 may also send a DL assignment 204 which indicates allocated resources for a further radio transmission 205 on the DL data channel, and proceed with sending the radio transmission 205 on the DL data channel. However, in this case the UE 50-1 may not be able to successfully decode the radio transmission 205 and send a NACK 206 to the pico base station 100.

As further illustrated in FIG. 2, the pico base station 100 may also send a DL assignment 207 which indicates allocated resources for a radio transmission 208 on the DL data channel, and proceed with sending the radio transmission 208 on the DL data channel. However, in this case it is assumed that the UE 50-1 does not receive the DL assignment 207 and therefore does not monitor the DL data channel for the radio transmission 208. Accordingly, the UE 50-1 will not send a NACK or ACK for the radio transmission 208.

As indicated by step 209, the pico base station 100 may then determine the channel quality of the DL CCH by evaluating the different types of feedback messages 203, 206.

For this purpose the pico base station 100 may for example monitor the rate of ACKs received from the UE 50-1. From the number or rate of ACKs, the channel quality of the DL CCH may be deduced by considering the relation of an error rate of radio transmissions on the DL data channel and an error rate of radio transmissions on the DL control channel. Because in LTE systems the radio transmissions on the DL data channel are organized in transport blocks, such error rates may be expressed as Block Error Rate (BLER).

For estimating the BLER of the DL CCH, the following relation may be used:

$$1-BLER_{data,eff}=(1-BLER_{data}) \times (1-BLER_{control}),$$

where $BLER_{data,eff}$ denotes the effective BLER as observed by the pico base station 100 through counted ACKs, assuming that the rate of ACKs is equal to $(1-BLER_{data,eff})$, $BLER_{data}$ denotes the BLER of the DL data channel, and $BLER_{control}$ denotes the BLER of the DL CCH.

This relation reflects that an overall success of a scheduled radio transmission, as acknowledged by an ACK, is achieved only if the DL assignment was successfully transmitted on the DL CCH and the radio transmission on the DL data channel was successfully transmitted on the DL data channel.

In some scenarios, $BLER_{data}$ may be estimated from information typically available at the pico base station 100, e.g., from information as available from a link adaptation mechanism. For example, the link adaptation mechanism may operate to select a modulation and coding scheme (MCS) for the DL data channel in such a way that a predefined BLER target, in the following referred to as $BLER_{data,tar}$, is reached. Assuming almost ideal link adaptation, $BLER_{data,tar}$ may be used as an estimate for $BLER_{data}$ in the above relation, which means that $BLER_{control}$ can be estimated as:

$$BLER_{control}=1-(1-BLER_{data,eff})/(1-BLER_{data,tar}).$$

If the mobile network provides protected resources, e.g., in the form of ABSs or RPSs, accuracy of the above estimate can be improved by performing the evaluation only for a subset of radio transmissions which are scheduled in unprotected resources.

The pico base station 100 may also estimate $BLER_{control}$ more directly by monitoring the rate of sent radio transmissions on the DL data channel, for which neither an ACK nor a NACK is received as expected, as illustrated for radio transmission 208 of FIG. 2. In such cases, if the UE 50-1 fails to decode a DL assignment transmitted on the DL CCH, it also will not monitor the DL data channel for the scheduled radio transmission. In fact, the UE 50-1 will not even be aware that a radio transmission on the DL data channel is scheduled for the UE 50-1. Consequently, the UE 50-1 will not send any feedback concerning this radio transmission. Accordingly, monitoring the rate of such scheduled radio transmissions for which neither an ACK nor a NACK is received may be used as a direct estimate of $BLER_{control}$.

When using LTE radio access technology as in the illustrated scenario, the pico base station will typically expect that the HARQ feedback for a radio transmission on the PDSCH is transmitted in certain resources of the PUCCH, which are defined by the resources of the PDCCH used for sending the DL assignment. The pico base station 100 may monitor the received energy in these resources and, if the received energy is below a threshold, the pico base station 100 may deduce that the HARQ feedback was not sent by the UE 50-1. By suitable adjusting the threshold, the risk of false detection of such events can be reduced to a tolerable value. For example, such false detection might occur because there is strong signal attenuation and the sent HARQ feedback produces only low received energy at the pico base station 100. Further, such false detection might occur because the received energy is above the threshold due to interference or noise.

A further option of determining $BLER_{control}$ is to use other control messages sent on the DL CCH and to monitor the reaction of the UE 50-1 to such control messages. In particular, the pico base station 100 may receive reports from the UE 50-1 which indicate a parameter affected by the control messages. From changes in the parameter, the pico base station 100 may then deduce whether a particular control message was successfully received by the UE 50-1.

In the illustrated scenario using LTE radio access technology, such control messages could be of a type referred to as Transmit Power Control (TPC) command. A TPC command instructs the UE 50-1 to change its transmit power by a certain amount. The UE 50-1 in turn reports an indication of its actually used transmit power. The transmit power may for example be indicated in terms of a Power Headroom Report (PHR), e.g., such as specified in 3GPP Technical Specification (TS) 36.321 V11.1.0. An example of such procedures is illustrated in FIG. 3.

Figure 3:
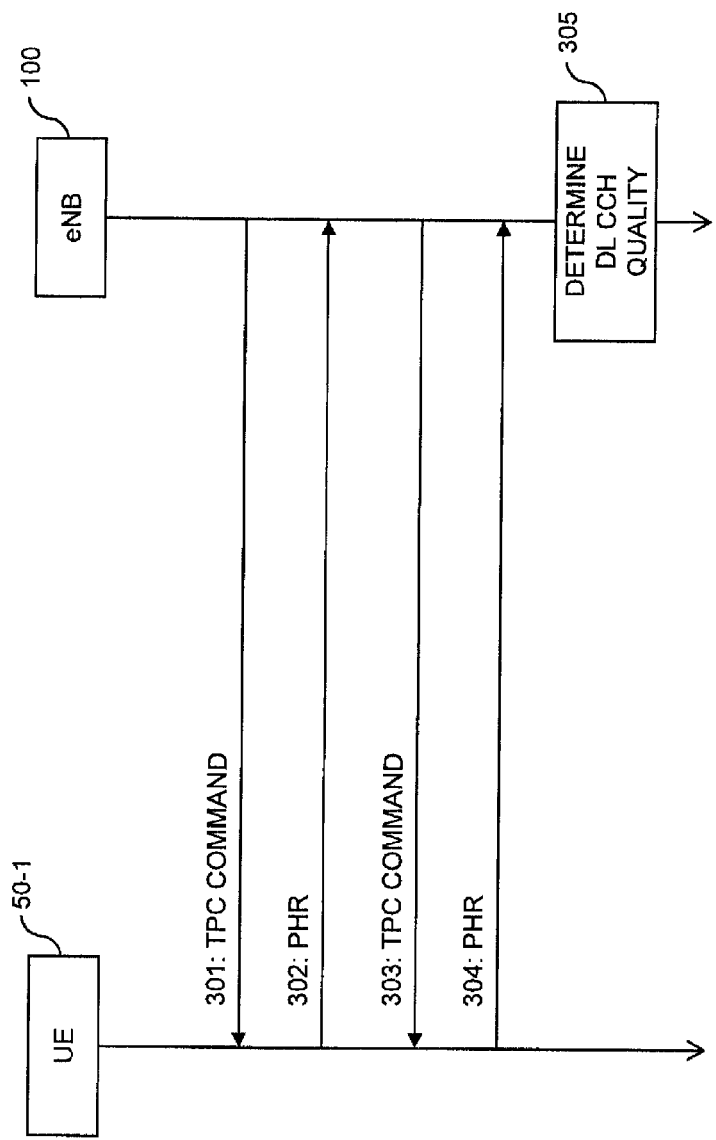
FIG. 3 shows a signalling diagram for illustrating further processes according to embodiments of the invention, which may be applied for determining a channel quality of a DL control channel from certain reports sent by the UE.

In the procedures of FIG. 3, the pico base station 100 sends a TPC command 301 to the UE 50-1 and subsequently receives a report 302 of the transmit power currently applied by the UE 50-1. The pico base station then sends a further TPC command 303 to the UE 50-1 and subsequently receives a report 304 of the transmit power currently applied by the UE 50-1. As indicated by step 305, the pico base station 100 may then determine the DL CCH quality by evaluating the reports from the UE 50-1.

In particular, if the reported transmit power remains unchanged after the pico base station 100 has sent a TPC command, the pico base station 100 can deduce that the transmission of the TPC command on the DL CCH failed due to low channel quality. By monitoring the rate of such failed transmissions of the TPC command, the pico base station may then estimate $BLER_{control}$.

The pico base station 100 may perform such evaluations on the basis of reports from the UE 50-1 repeatedly and average the results of such repeated evaluations to obtain a more precise estimate.

Because TPC commands, and also other similar commands, may be sent at a much lower rate than radio transmissions on the DL data channel, it may be in some cases advantageous to combine this option with the above option of monitoring feedback messages, e.g., by averaging. The latter option may also help to address situations when the UE 50-1 is operating at its transmit power limit, so that TPC commands will not have the expected effect.

The above options have the advantage that the pico base station 100 may evaluate characteristics which can be observed by the pico base station 100 itself which means that these options can be efficiently implemented without impact on the UE 50-1 or other network nodes.

In further options, the pico base station 100 may also receive specific information for determining the channel quality of the DL CCH. For example, such information could be received from the UE 50-1 or from another network node, e.g., from the macro base station 100'.

For example, the pico base station 100 may request a measurement report for the channel quality of the DL CCH from the UE 50-1. The UE 50-1 may perform corresponding measurements on the DL CCH and provide a report of such measurements to the pico base station 100, which may then determine the channel quality of the DL CCH from the reported measurements. An example of such procedures is illustrated in FIG. 4.

Figure 4:
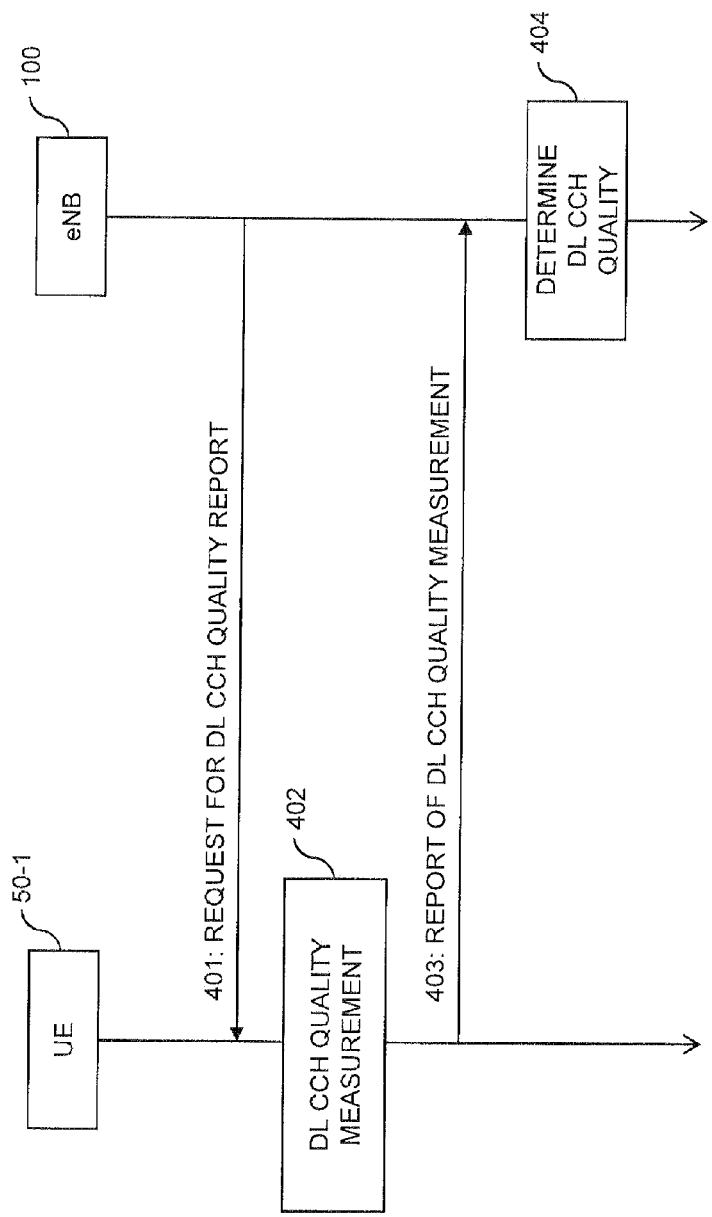
FIG. 4 shows a signalling diagram for illustrating further processes according to embodiments of the invention, which may be applied for determining a channel quality of a DL control channel from measurement reports sent by a UE.

In the procedures of FIG. 4, the pico base station 100 sends a request 401 to the UE 50-1 to initiate reporting of the DL CCH quality. Upon receiving the request 401, the UE 50-1 may perform measurements on the DL CCH and/or aggregate results from previously performed measurements on the DL CCH, as indicated by step 402. The UE 50-1 may then send a report 403 of the measurements to the pico base station 100. From the report 403, the pico base station 100 may determine the channel quality of the DL CCH. In some cases, the channel quality of the DL CCH may already be determined by the UE 50-1 and indicated in the report 403. In further cases, the pico base station 100 may further process measurement results in the report 403 to determine the channel quality of the DL CCH. The request 401 may also indicate that the UE 50-1 should perform the measurements in unprotected resources, e.g., not in ABSs or RPSs, to accurately reflect the impact of interference from other cells.

According to a further example, the pico base station 100 may request information on the utilization of the DL CCH of a further cell from another network node. For example, the pico base station may request such utilization information from the macro base station 100' which serves the cell 10'. The other network node may determine the utilization information and provide the utilization information to the pico base station 100, which may then determine the channel quality of the DL CCH from the reported utilization information. The DL CCH utilization information may for example be provided in terms of a load on the DL CCH, e.g., indicting a relative portion of utilized resources of the DL CCH.

The pico base station 100 may perform such evaluations on the basis of measurement reports from the UE 50-1 repeatedly and average the results of such repeated evaluations to obtain a more precise estimate.

Figure 5:
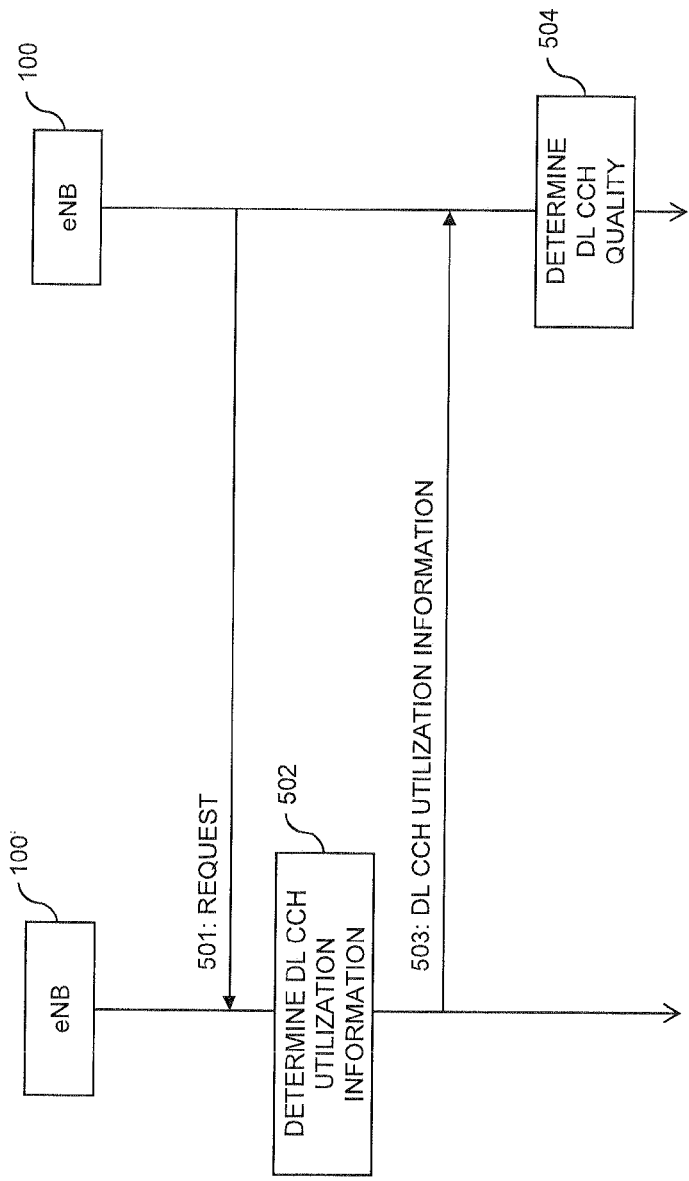
FIG. 5 shows a signalling diagram for illustrating further processes according to embodiments of the invention, which may be applied for determining a channel quality of a DL control channel from information on the utilization of a DL control channel of another cell.

An example of such procedures for reporting DL CCH utilization information is illustrated in FIG. 5. In the procedures of FIG. 5, the pico base station 100 sends a request 501 to the macro base station 100' to initiate reporting of the utilization information. Upon receiving the request 501, the macro base station may determine the utilization information, as indicated by step 502, and indicate it to the pico base station 100, as indicated by step 503. From the utilization information 503, the pico base station 100 may determine the channel quality of the DL CCH. The messages 501 and 503 of FIG. 5 may for example be transmitted via the X2 interface defined between LTE base stations.

Using procedures as explained in connection with FIG. 5, the pico base station 100 may request the DL CCH utilization information from the macro base station that creates most interference to a certain UE 50-1, 50-2 in its cell 10.

Based on this knowledge the pico base station can estimate the probability that the DL CCH of the interfering macro base station will not collide with its own DL CCH, which may be used as an estimate of the channel quality of the DL CCH.

The DL CCH utilization information may also be reported in terms of a parameter that relates the load on the DL CCH of the further cell to the load of the DL data channel of the further cell. In some cases, the pico base station 100 may already have access to the load on the DL data channel of the further cell. For example, this load may be reflected in channel quality reports provided to the pico base station 100, e.g., channel quality reports based on shifted CRS or dedicated reference symbols for interference measurement such as defined in 3GPP TS 36.213 V11.1.0 or 36.331 V11.2.0. In connection with the reported parameter, the pico base station 100 may then estimate the actual utilization of the DL CCH of the further cell and estimate the channel quality of the DL CCH for a certain UE in its cell. This way of reporting the DL CCH utilization information may help to reduce the associated load on the pico base station's interface(s) to other network nodes, such as on the X2 interface.

The determined channel quality of the DL CCH may then be used as an input to the scheduling mechanism implemented at the pico base station 100. A block diagram for illustrating a corresponding implementation of a scheduling mechanism is shown in FIG. 6.

Figure 6:
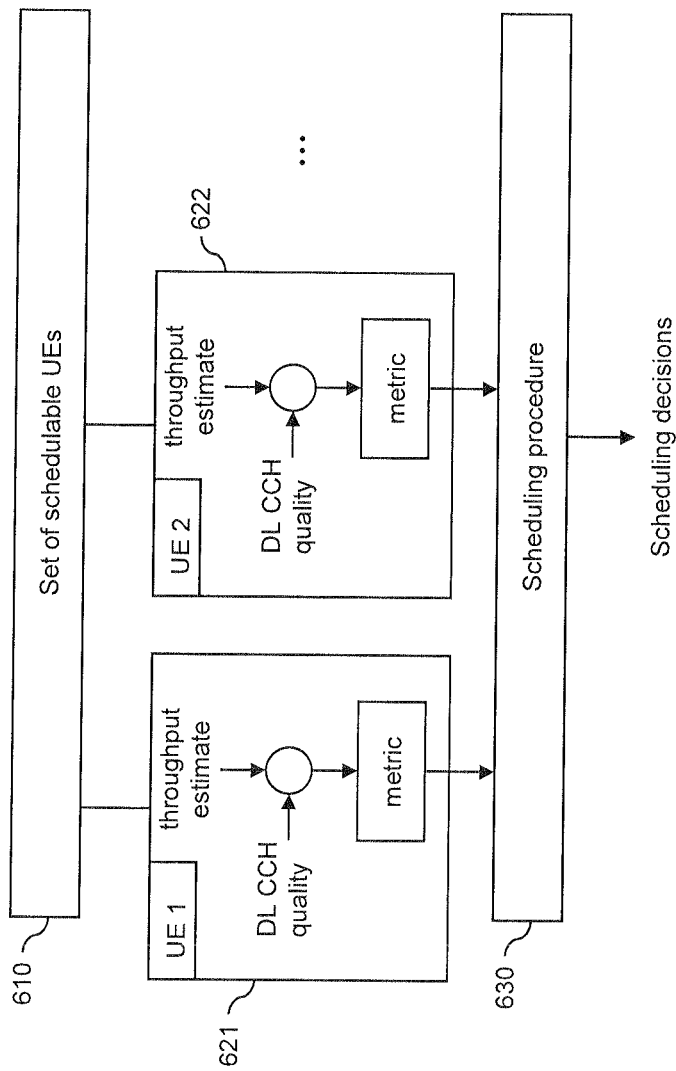
FIG. 6 shows a block diagram for illustrating utilization of the DL control channel quality in a scheduling mechanism according to an embodiment of the invention.

The implementation of FIG. 6 is based on a scheduling algorithm in which a scheduling metric of a certain UE is determined depending on an estimate of the data throughput of this UE. In addition, the scheduling metric is weighted by the determined channel quality of the DL CCH. The scheduling metric is then used for prioritizing the different UEs against each other by first allocating resources to the UE with the highest scheduling metric. The resources may for example be allocated in units of resource blocks, as for example defined for the LTE radio access technology. The scheduling metric is determined in accordance with a given scheduling goal of the scheduling algorithm, e.g., fairness among users.

As illustrated in FIG. 6, the scheduling mechanism may start from a set 610 of schedulable UEs. The set of schedulable UEs may include all UEs in the cell or a subgroup thereof.

Then, as indicated by blocks 621 and 622, a scheduling metric is determined for each UE from the set 610. As illustrated, the scheduling metric may be determined depending on a throughput estimate for the UE and further weighted by the channel quality of the DL CCH determined for this UE.

For example, when using a Proportional Fair in Time and/or Frequency (PFTF) scheduling algorithm, the scheduling metric for UE k, resource block n, and time instance i may be determined according to:

$$F_{k,n}(i) = R_{k,n}(i)/T_k(i),$$

where $T_k(i)$ is the average data throughput of the UE k experienced in the past, and $R_{k,n}(i)$ is an estimate of the instantaneous supportable data rate of UE k in resource block n.

To take into account the channel quality of the DL CCH, the scheduling metric can be weighted by the determined channel quality of the DL CCH. For example, if the channel quality is expressed as mentioned above by $(1-\text{BLER}_{control})$, the weighted scheduling metric can be determined according to:

$$F_{k,n}(i) = (1-\text{BLER}_{control}) \times R_{k,n}(i)/T_k(i).$$

If protected resources, e.g., as ABSs and/or RPSs, and unprotected resources, e.g., as normal subframes, are provided, $BLER_{control}$ and $R_{k,n}$ may be provided separately for each of these resource types. $R_{k,n}$ can be determined based on the channel quality indicator (CQI) reported by the UE. Separate CQI reporting for ABSs and normal subframes may for example be implemented as described in 3GPP TS 36.331 V11.2.0, section 6.3.2.

As illustrated by block 630, the weighted scheduling metrics of the different UEs may then be used in the scheduling procedure to take scheduling decisions. In particular, a resource block of the data channel may be allocated to that UE which has the highest weighted scheduling metric.

By weighting the scheduling metric with the determined channel quality of the DL CCH, the scheduling goal of the scheduling algorithm, e.g., fairness among users, can be maintained even if some of the users experience a degraded channel quality of the DL CCH.

Figure 7:
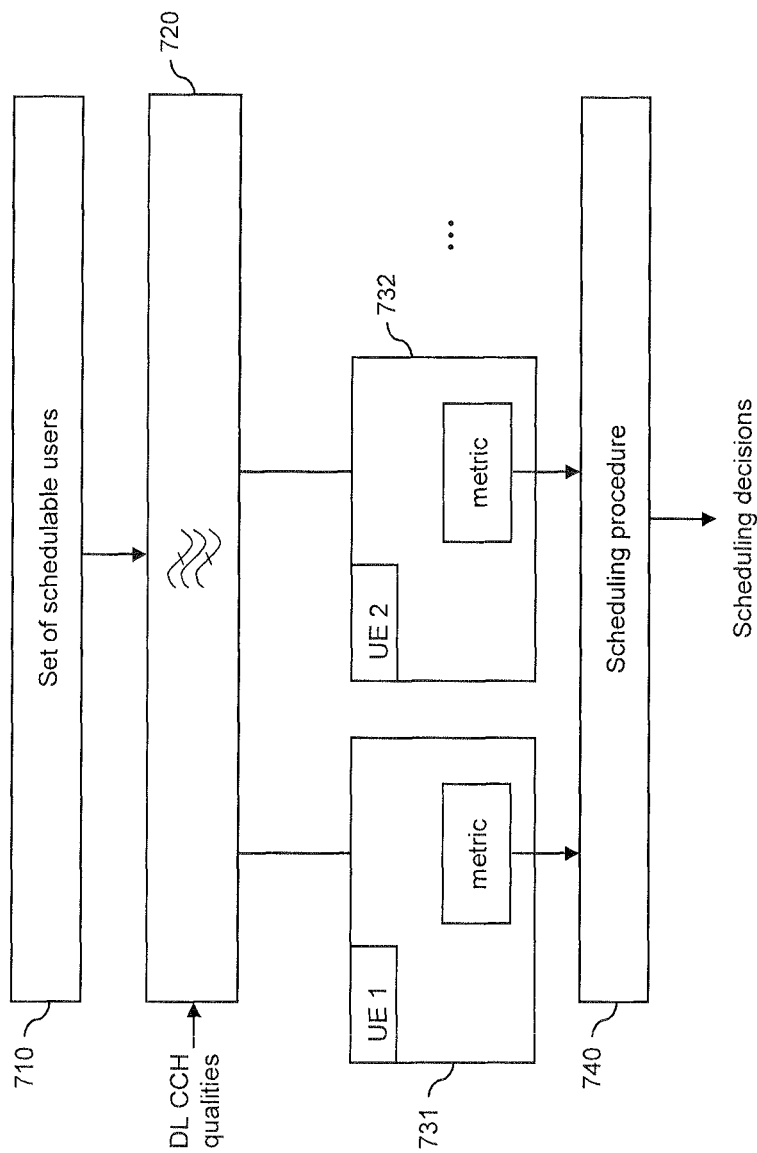
FIG. 7 shows a block diagram for illustrating utilization of the DL control channel quality in a further scheduling mechanisms according to an embodiment of the invention.

A further implementation of a scheduling mechanism utilizing the channel quality of the DL CCH is illustrated in FIG. 7. In the implementation of FIG. 7, the determined channel quality of the DL CCH is used to determine whether a certain UE can be scheduled in unprotected radio resources or should alternatively be scheduled in protected radio resources, e.g., ABSs or RPSs.

As illustrated in FIG. 7, the scheduling mechanism may start from a set 710 of schedulable UEs. The set of schedulable UEs may include all UEs in the cell or a subgroup thereof.

As indicated by block 720, the set 710 is filtered depending on the channel quality of the DL CCH as determined for the UEs in the set 710. For this purpose, the channel quality of the DL CCH as determined for a certain UE may be compared to a threshold. If the channel quality of the DL CCH is equal to or above the threshold, the UE may be scheduled in unprotected radio resources, using a scheduling metric as determined in blocks 731 and 732. Otherwise, i.e., if the scheduling metric is below the threshold, the UE may be filtered out and scheduled in protected radio resources. As compared to blocks 621 and 622 of FIG. 6, the determination of the scheduling metric in blocks 731 and 732 may be based on other criteria than estimated throughput.

As illustrated by block 740, the weighted scheduling metrics of the different UEs may then be used in the scheduling procedure to take scheduling decisions. In particular, a resource block of the data channel may be allocated to that UE which has the highest weighted scheduling metric.

Using the scheduling mechanism of FIG. 7, the number of UEs which are scheduled in unprotected radio resources can be dynamically adapted to the interference situation. For example, a certain UE may be generally prone to interference from another cell, but at certain times, the channel quality of the DL CCH may be still sufficient to allow scheduling of the UE in unprotected radio resources, e.g., if there is low activity in the other cell.

Figure 8:
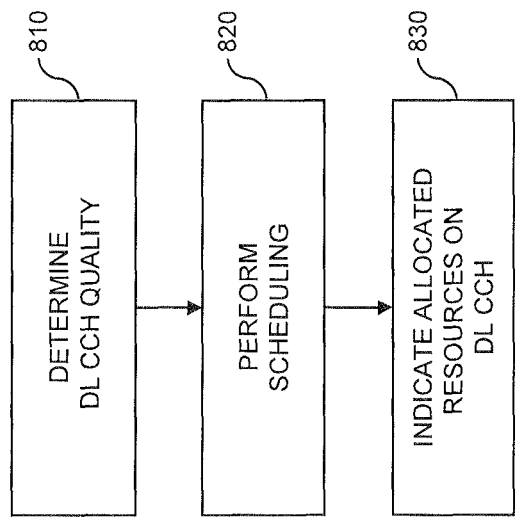
FIG. 8 shows a flowchart for illustrating a method according to an embodiment of the invention.

FIG. 8 shows a flowchart for illustrating a method of controlling radio transmissions in a mobile network. The method may be used for implementing the above-described concepts in a node of the mobile network. In particular, this node may be responsible for scheduling radio transmissions in a cell of the mobile network, such as an eNB when using LTE radio access technology or an Radio Network Controller (RNC) when using UMTS radio access technology. The node may for example correspond to the pico base station 100.

At step 810, the node may determine the channel quality of the DL CCH for a UE in the cell.

For this purpose, the node may receive a measurement report from the UE and determine the channel quality of the DL CCH on the basis of the measurement report, e.g., as explained in connection with FIG. 4. The node may also send a request for the measurement report from the UE and receive the measurement report in response to the request.

Alternatively or in addition, the node may receive control channel utilization information from a further node of the mobile network, e.g., from a neighboring macro base station such as the macro base station 100', and determine the channel quality of the DL CCH on the basis of the received control channel utilization information, e.g., as explained in connection with FIG. 5. The control channel utilization information may indicates utilization of a DL CCH of the further cell, e.g., in terms of a load on the DL CCH or in terms of a parameter relating the load on the DL CCH of the further cell to a load on a data channel of the further cell.

Alternatively or in addition, the node may also determine the channel quality of the DL CCH by monitoring feedback messages from the UE, e.g., as explained in connection with FIG. 2. For this purpose, the node may send radio transmissions on the data channel to the UE and receive feedback messages from the UE, which each positively or negatively acknowledge receipt of a radio transmission by the UE. Such feedback messages may be monitored to determine the channel quality of the DL CCH, e.g., in terms of a BLER. For example, a rate of those feedback messages may be monitored by the node, which positively acknowledge receipt of a radio transmission. Alternatively or in addition, a rate of those radio transmissions may be monitored by the node, for which none of the feedback messages, i.e., neither positive nor negative acknowledgement, is received by the node.

Alternatively or in addition, the node may also determine the channel quality of the DL CCH by sending control messages on the DL CCH to the UE and monitoring the UE's reaction, as explained in connection with FIG. 3. For example, the node may send control messages to the UE and receive reports from the UE which indicate a parameter affected by the control messages. The node may then determine the channel quality of the DL CCH by evaluating the parameter indicated by the reports, e.g., by comparing successively received parameters to identify whether the parameter changed as expected in reaction to the control message. The control messages may for example be commands for changing the transmit power of the UE, such as the above-mentioned TPC commands. The parameter indicated by the reports may then be currently applied transmit power of the UE.

At step 820, the node may perform scheduling of a radio transmission to the UE. This may in particular involve allocating radio resources of a data channel of the cell for the radio transmission. The scheduling is performed depending on the channel quality of the DL CCH as determined at step 810. The resources may be allocated in the time and/or frequency domain, e.g., from a time/frequency grid as for example used in LTE radio access technology. Alternatively or in addition, the resources may also be allocated in the code domain.

For performing the scheduling depending on the channel quality of the DL CCH, the node may for example compare the determined channel quality of the DL CCH to a threshold. Depending on a result of the comparison, the node may then select radio resources for scheduling the at least one radio transmission. In particular, the node may select between protected radio resources, e.g., ABSs or RPSs, and unprotected radio resources, e.g., non-ABSs and non-RPSs, which are potentially subject to interference from a further cell of the mobile network. More specifically, in response to the channel quality of the DL CCH being above the threshold, the node may schedule the at least one radio transmission in the unprotected radio resources which are. In response to the channel quality of the DL CCH being below the threshold, the node may schedule the at least one radio transmission in the protected radio resources. Such selective scheduling of a certain UE in unprotected radio resources may for example be implemented by filtering as explained in connection with FIG. 7.

In some scenarios, the node may also apply a scheduling algorithm depending on the determined channel quality of the downlink control channel. The scheduling algorithm is used for allocating radio resources of the data channel among the UE and one or more further UEs in the cell. For this purpose, the scheduling algorithm may use certain inputs, e.g., estimated throughput and/or channel quality of the data channel, to determine a scheduling metric fort he UE. Similar determinations may be performed for the other UEs. When allocating the resources, the UEs may then be prioritized according to their respective scheduling metric. To perform the scheduling depending on the determined channel quality of the DL CCH, the scheduling metric may be further determined depending on the channel quality of the DL CCH, e.g., by weighting the scheduling metric with the channel quality of the DL CCH as explained in connection with FIG. 6.

At step 830, the node may indicate the allocated resources on the DL CCH to the UE. For example, if the allocated resources pertain to a DL radio transmission on a DL data channel, the allocated resources may be indicated in a DL assignment, such as the DL assignments 201, 204, 207 of FIG. 2. If the allocated resources pertain to an UL radio transmission on a UL data channel, the allocated resources may be indicated in an UL grant. By taking into account the channel quality of the DL CCH in the scheduling process, the risk of failure of such transmissions of DL assignments and UL grants may be reduced, and consequently the efficiency of the scheduling process improved.

Figure 9:
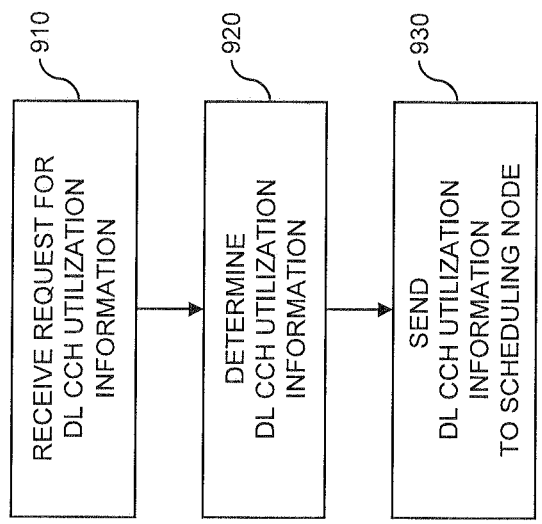
FIG. 9 shows a flowchart for illustrating a further method according to an embodiment of the invention.

FIG. 9 shows a flowchart for illustrating a method of controlling radio transmissions in a mobile network. The method may be used for implementing the above-described concepts in a node of the mobile network. In particular, this node may be responsible for scheduling radio transmissions in a cell of the mobile network, such as an eNB when using LTE radio access technology or an Radio Network Controller (RNC) when using UMTS radio access technology. The node may for example correspond to the macro base station 100'.

At step 910, the node may receive a request for information on utilization of a DL CCH of the cell. The request may for example be received from a node responsible for scheduling radio transmissions on a data channel of a further cell of the mobile network.

At step 920, the node may determine information on utilization of the DL CCH of the cell, e.g., as requested in step 910. This control channel utilization information may for example comprises a parameter relating a load of the of the DL CCH of the cell to a load of a data channel of the cell. Alternatively, the control channel utilization information may also explicitly indicate the load of the DL CCH of the cell.

At step 930, the node may send the information on utilization of the DL CCH of the cell to a further node which is responsible for scheduling radio transmissions on a data channel of a further cell of the mobile network. This may be accomplished in response to a request from the node, e.g., the request of step 910.

Exemplary processes in accordance with the method of FIG. 9 are explained in connection with FIG. 5.

Figure 10:
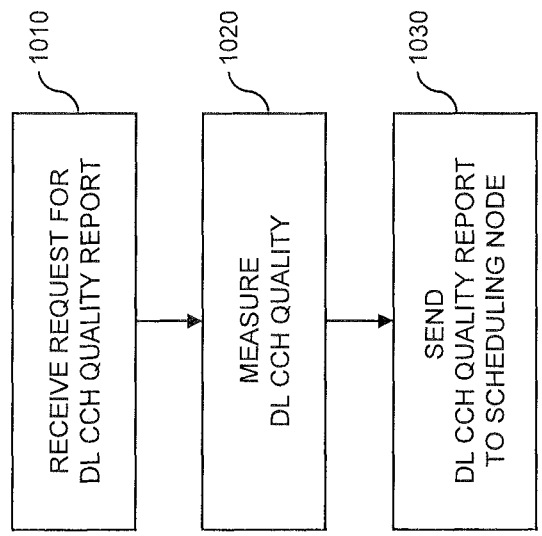
FIG. 10 shows a flowchart for illustrating a further method according to an embodiment of the invention.

FIG. 10 shows a flowchart for illustrating a method of controlling radio transmissions in a mobile network. The method may be used for implementing the above-described concepts in a UE for connecting to the mobile network. The UE may for example correspond to the UE 50-1.

At step 1010, the UE may receive a request for a measurement report on the channel quality of a DL CCH of the cell. The request may for example be received from a node responsible for scheduling radio transmissions on a data channel of the cell.

At step 1020, the UE may determine the channel quality of the DL CCH of the cell, e.g., by performing measurements and/or aggregating results from previously performed measurements. The UE may perform such measurements on radio resources which are unprotected, i.e., subject to potential interference from a further cell of the mobile network, e.g., on non-ABSs or non-RPSs. On the basis of the measurements, the UE may determine the channel quality of the DL CCH.

At step 1030, the UE may send a measurement report indicating the determined channel quality of the DL CCH to a node which is responsible for scheduling radio transmissions on a data channel of the cell. This may be accomplished in response to a request from the node, e.g., the request of step 1010.

Exemplary processes in accordance with the method of FIG. 10 are explained in connection with FIG. 4.

It is noted that the methods of FIGS. 8, 9 and 10 may be combined with each other. In particular, the method of FIG. 9 and/or the method of FIG. 10 may be used to provide inputs to step 810 of FIG. 8.

Figure 11:
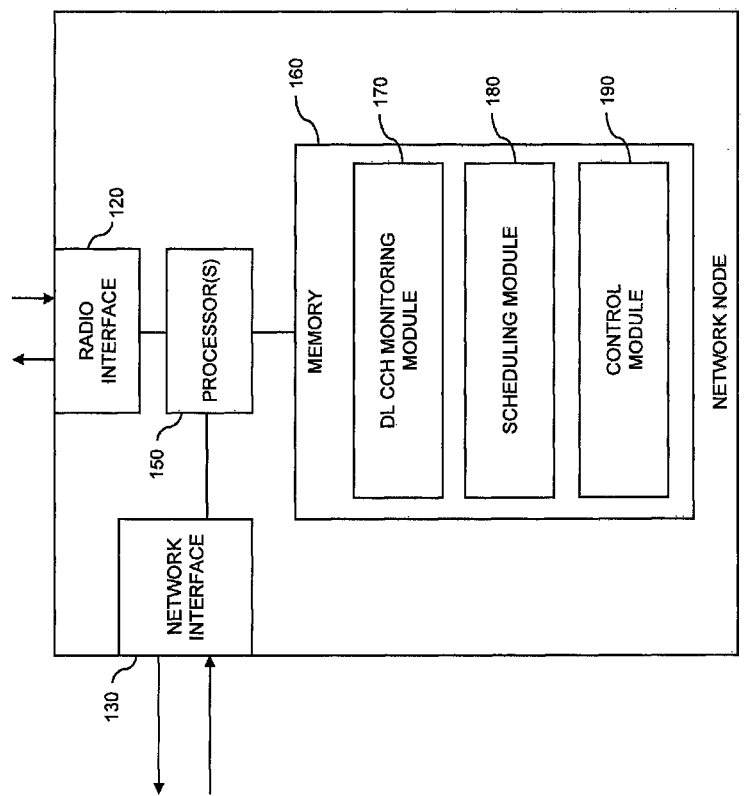
FIG. 11 schematically illustrates implementation of a network node according to an embodiment of the invention.

FIG. 11 illustrates exemplary structures which may be used for implementing the above concepts in a node of a mobile network, such as the pico base station 100 or the macro base station 100'.

As illustrated, the may include a radio interface 120, e.g., if the node is implemented as a base station which is also responsible for scheduling radio transmissions, such as an eNB in the LTE radio access technology. The radio interface 120 may then be used for establishing a radio link to UEs in a cell served by the node. Such radio links may be provided using a DL CCH of the cell and a data channel of the cell, e.g., a DL data channel and/or an UL data channel. Further, the radio links may also be provided using an UL CCH of the cell. In some scenarios, the radio interface 120 may also be used for establishing a wired connection to a separate radio unit, e.g., if the node is implemented as an RNC. Further, the node may also be provided with a network interface 130 for connecting to other nodes of the mobile network. For example, if the node is implemented as a base station, such as an eNB, the network interface may be used for providing a connection to other base stations. For example, the network interface 130 may implement the X2 interface as specified for the LTE radio access technology.

Further, the node includes one or more processors 150 coupled to the interfaces 120, 130, and a memory 160 coupled to the processor(s) 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the node. In particular, the memory 160 may include a DL CCH monitoring module 170 for implementing the above-described functionalities for determining the channel quality of the DL CCH, using evaluations at the node itself and/or on the basis of information received via the radio interface 120 and/or the network interface 130. Further, the memory 160 may also include a scheduling module 180 for implementing the above-mentioned functionalities of scheduling radio transmissions in the cell served by the node, e.g., by allocating resources on the DL data channel and/or UL data channel and indicating the allocated resources to one or more UEs in the cell, using the radio interface 120. This scheduling may in particular be performed depending on the channel quality or channel qualities as determined by the DL CCH monitoring module 170. Still further, the memory 160 may include a control module 190 for implementing various control functionalities, e.g., for controlling the UEs in the cell served by the node, establishing and/or maintaining the radio links, or the like.

It is to be understood that the structures as illustrated in FIG. 11 are merely schematic and that the node may actually include further components which, for the sake of clarity, have not been illustrated, e.g., further interfaces or processors. Also, it is to be understood that the memory 160 may include further types of program code modules, which have not been illustrated, e.g., program code modules for implementing known functionalities of an eNB or RNC. Also, it should be understood that in some implementations the DL CCH monitoring module 170 may be used for implementing the above-mentioned functionalities of determining the DL CCH utilization information and indicating it to other nodes, e.g., if the node implements functionalities of the macro base station 100'. According to some embodiments, also a computer program product may be provided for implementing functionalities of the node, e.g., in the form of a medium storing the program code and/or other data to be stored in the memory 160.

Figure 12:
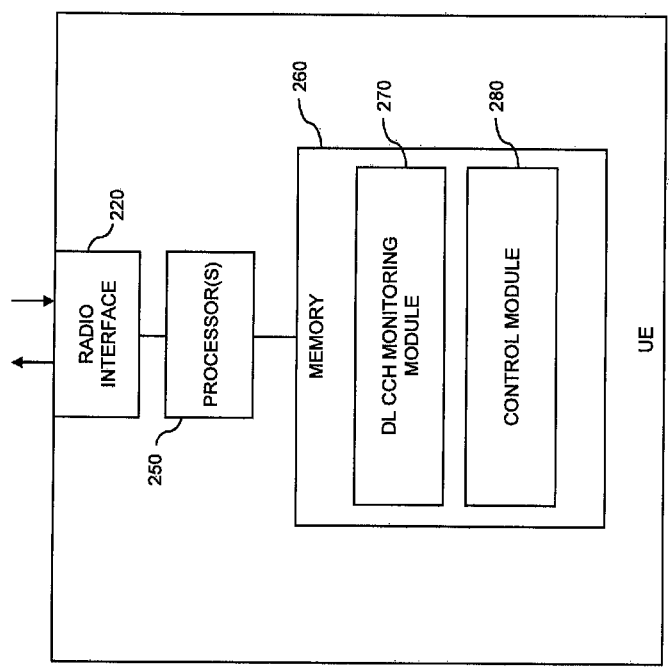
FIG. 12 schematically illustrates implementation of a UE according to an embodiment of the invention.

FIG. 12 illustrates exemplary structures which may be used for implementing the above concepts in a UE for connecting to a cell of a mobile network, such as one of the UEs 50-1, 50-2, 50-3.

As illustrated, the UE is provided with a radio interface 220 for connecting to the cell of the mobile network. Such radio link may be provided using a DL CCH of the cell and a data channel of the cell, e.g., a DL data channel and/or an UL data channel. Further, the radio links may also be provided using an UL CCH of the cell.

Further, the UE includes one or more processors 250 coupled to the radio interface 220 and a memory 260 coupled to the processor(s) 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor(s) 250 so as to implement the above-described functionalities of the UE. In particular, the memory 260 may include a DL CCH monitoring module 270 for implementing the above-described functionalities for determining the channel quality of the DL CCH as experienced by the UE and/or for performing measurements for determining the channel quality of the DL CCH. The DL CCH monitoring module may also provide functionalities for reporting the results of such measurements and/or the channel quality of the DL CCH determined therefrom. In particular, such information may be reported to a node which is responsible for scheduling radio transmissions in the cell, such as an eNB or RNC. Further, the memory 260 may also include a control module 280 for implementing various control functionalities, e.g., for controlling operations related to transmissions on the radio interface 220, e.g., with respect to reacting to received control messages, sending feedback for radio transmissions on the DL data channel, or the like.

It is to be understood that the structures as illustrated in FIG. 12 are merely schematic and that the UE may actually include further components which, for the sake of clarity, have not been illustrated, e.g., further interfaces or processors. Also, it is to be understood that the memory 260 may include further types of program code modules, which have not been illustrated, e.g., program code modules for implementing known functionalities of a UE. According to some embodiments, also a computer program product may be provided for implementing functionalities of the UE, e.g., in the form of a medium storing the program code and/or other data to be stored in the memory 260.

As can be seen, the concepts as described above may be used for efficiently controlling radio transmission in a cell of a mobile network. In particular, scheduling can be performed in a manner which takes into account the actual channel quality of the DL CCH as individually experienced by UEs in the cell, thereby avoiding waste of resources due to allocation of resources to UEs with insufficient channel quality of the DL CCH. Further, if the mobile network provides protected radio resources in which interference from other cells is reduced, such as ABSs or RPSs, such protected radio resources may be efficiently utilized, e.g., by scheduling only those UEs in the protected radio resources, for which the channel quality of the DL CCH was determined to be insufficient.

It is to be understood that the examples and embodiments as explained above are merely illustrative and susceptible to various modifications. For example, the scheduling depending on the channel quality of the DL CCH may be applied in various network deployments, also including homogeneous in which different base stations operate at substantially the same power. Still further, its should be understood that the illustrated concepts may be applied with respect to scheduling of DL radio transmissions, UL radio transmissions, or both. The concepts may also be applied in connection with various types of scheduling algorithms, including the above-mentioned PFTF scheduling algorithm, but also other scheduling algorithms, such as a maximum data channel quality scheduling algorithm. Also, some of the described functionalities may be distributed in different nodes. For example, when using UMTS radio access technology, functionalities as described for the pico base station 100 or macro base station 100' may be distributed between an RNC and a Node B. Accordingly, the illustrated nodes may be implemented by a single device or by a system of multiple devices. Moreover, it is to be understood that the above concepts may be implemented by using correspondingly designed software to be executed by one or more processors of an existing device, or by using dedicated device hardware.

The invention claimed is:

1. A method performed by a node in a mobile network for controlling radio transmission in the mobile network, the method comprising:
sending control messages to a user equipment, UE, on a downlink control channel, wherein the control messages are commands for changing the transmit power of the UE;

receiving, from the UE, reports indicating a parameter affected by the control messages, wherein the parameter indicated by the reports is the currently applied transmit power of the UE;
evaluating the parameters indicated in the received reports;
determining a channel quality of the downlink control channel for the UE based on the evaluation;
scheduling at least one radio transmission on a data channel based on the determined channel quality of the downlink control channel; and
indicating, on the downlink control channel, radio resources allocated for the scheduled at least one radio transmission.

2. The method according to claim 1, comprising:
depending on the determined channel quality of the downlink control channel, applying a scheduling algorithm for allocating radio resources of the data channel among the UE and one or more further UEs in the cell.

3. The method according to claim 2, comprising:
depending on the determined channel quality of the downlink control channel, determining a scheduling metric assigned to the UE.

4. The method according to claim 1, the method further comprising:
receiving a measurement report from the UE; and
determining the channel quality of the downlink control channel further based on the measurement report.

5. The method according to claim 1, the method further comprising:
receiving control channel utilization information from a further node of the mobile network, the control channel utilization information indicating utilization of a further downlink control channel of a further cell of the mobile network; and
determining the channel quality of the downlink control channel further based on the received control channel utilization information.

6. The method according to claim 1, the method further comprising:
sending radio transmissions to the UE on the data channel;
receiving feedback messages from the UE, each feedback message positively or negatively acknowledging receipt of a radio transmission by the UE; and
determining the channel quality of the downlink control channel by monitoring the feedback messages from the UE.

7. The method according to claim 6,
wherein said monitoring of the feedback messages comprises monitoring a rate of those feedback messages which positively acknowledge receipt of a radio transmission.

8. The method according to claim 6,
wherein said monitoring of the feedback messages comprises monitoring a rate of those radio transmissions for which none of the feedback messages is received by the node.

9. A computer program product, the computer program product comprising a non-transitory computer readable medium storing program code, which, when executed by at least one processor of a node for a mobile network causes the node to operate in accordance with a method according to claim 1.

10. A method performed by a first node in a mobile network for controlling radio transmission in the mobile network, the method comprising:

receiving, from a second node, a request for downlink control channel utilization information, wherein the first node is a macro base station and the second node is a pico base station;
determining the downlink control channel utilization information of a first cell of the mobile network provided by the first node; and
sending, to the second node, the determined downlink control channel utilization information, wherein the second node is configured to schedule radio transmissions on a data channel of a second cell of the mobile network.

11. The method according to claim 10, wherein the downlink control channel utilization information comprises a parameter relating a load of the downlink control channel of the cell to a load of a data channel of the cell.

12. A method performed by a user equipment, UE, in a mobile network for controlling radio transmission in the mobile network, the method comprising:
receiving a request for a measurement report on a channel quality of a downlink control channel of a cell of the mobile network,
wherein the request is sent by a node in the mobile network, and
wherein the node is responsible for scheduling of radio transmissions on a data channel of the cell;
in response to the request for the measurement report, performing measurements of the downlink control channel and aggregating one or more previously performed measurements;
determining the channel quality of the downlink control channel of the cell based on the performed measurements and the aggregated measurements;
sending the measurement report indicating the determined channel quality of the downlink control channel to the node;
receiving from the node, control messages on the downlink control channel, wherein the control messages are commands for changing the transmit power of the UE; and
sending, to the node, reports indicating a parameter affected by the control messages, wherein the parameter indicated by the reports is the currently applied transmit power of the UE, wherein the node is configured to evaluate the parameters indicated in the received reports and determine the channel quality of the downlink control channel based on the evaluation.

13. The method according to claim 12, comprising:
performing measurements on radio resources which are potentially subject to interference from a further cell of the mobile network; and
determining the channel quality of the downlink control channel on the basis of the performed measurements.

14. A computer program product, the computer program product comprising a non-transitory computer readable medium storing program code, which, when executed by at least one processor of a user equipment for a mobile network causes the user equipment to operate in accordance with a method according to claim 12.

15. A node for a mobile network, the node comprising:
a memory;
at least one interface; and
at least one processor, wherein the at least one processor is configured to:

send control messages to a user equipment, UE, on a downlink control channel, wherein the control messages are commands for changing the transmit power of the UE, receive, from the UE, reports indicating a parameter affected by the control messages, wherein the parameter indicated by the reports is the currently applied transmit power of the UE, evaluate the parameters indicated in the received reports, determine a channel quality of the downlink control channel for the UE based on the evaluation, schedule at least one radio transmission on a data channel based on the determined channel quality of the downlink control channel, and via the at least one interface, indicate, on the downlink control channel, radio resources for the scheduled at least one radio transmission on the data channel.

16. The node according to claim 15, wherein the at least one processor is configured to:
compare the determined channel quality of the downlink control channel to a threshold; and
schedule the at least one radio transmission in radio resources which are selected depending on a result of the comparison.

17. The node according to claim 16, wherein the at least one processor is configured to do one or more of:
in response to the channel quality of the downlink control channel being above the threshold, schedule the at least one radio transmission in radio resources which are potentially subject to interference from a further cell of the mobile network; and
in response to the channel quality of the downlink control channel being below the threshold, schedule the at least one radio transmission in radio resources which are protected from interference from a further cell of the mobile network.

18. The node according to claim 15, wherein the at least one processor is configured to:
depending on the determined channel quality of the downlink control channel, apply a scheduling algorithm for allocating radio resources of the data channel among the UE and one or more further UEs in the cell.

19. The node according to claim 18, wherein the at least one processor is configured to:
depending on the determined channel quality of the downlink control channel, determine a scheduling metric assigned to the UE.

20. The node according to claim 15, wherein the at least one processor is configured to:
via the at least one interface, receive a measurement report from the UE; and
determine the channel quality of the downlink control channel further based on the measurement report.

21. The node according to claim 15, wherein the at least one processor is configured to:
via the at least one interface, receive control channel utilization information from a further node of the mobile network, the control channel utilization information indicating utilization of a further downlink control channel of a further cell of the mobile network; and
determine the channel quality of the downlink control channel further based on the received control channel utilization information.

22. The node according to claim 15, wherein the at least one processor is configured to:

via the at least one interface, send radio transmissions to the UE on the data channel;
via the at least one interface, receive feedback messages from the UE, each feedback message positively or negatively acknowledging receipt of a radio transmission by the UE; and
determine the channel quality of the downlink control channel by monitoring the feedback messages from the UE.

23. The node according to claim 22, wherein said monitoring of the feedback messages comprises monitoring a rate of those feedback messages which positively acknowledge receipt of a radio transmission.

24. The node according to claim 22, wherein said monitoring of the feedback messages comprises monitoring the rate of those radio transmissions for which none of the feedback messages is received by the node.

25. A first node for a mobile network, the first node comprising:
a memory;
at least one interface; and
at least one processor, wherein the at least one processor is configured to:
receive, from a second node, a request for downlink control channel utilization information, wherein the first node is a macro base station and the second node is a pico base station,
determine the downlink control channel utilization information of a first cell of the mobile network provided by the first node, and
via the at least one interface, send, to the second node, the determined downlink control channel utilization information, wherein the second node is configured to schedule radio transmissions on a data channel of a second cell of the mobile network.

26. The node according to claim 25, wherein the downlink control channel utilization information comprises a parameter relating a load of the downlink control channel of the cell to a load of a data channel of the cell.

27. A user equipment, UE, for a mobile network, comprising:
a radio interface;
a memory; and
at least one processor, wherein the at least one processor is configured to:
receive a request for a measurement report on a channel quality of a downlink control channel of a cell of the mobile network,
wherein the request is sent by a node in the mobile network, and
wherein the node is responsible for scheduling of radio transmissions on a data channel of the cell,
in response to the request for the measurement report, perform measurements of the downlink control channel and aggregate one or more previously performed measurements,
determine the channel quality of the downlink control channel of the cell based on the performed measurements and the aggregated measurements,
via the radio interface, send the measurement report indicating the determined channel quality of the downlink control channel to the node,
via the radio interface, receive, from the node, control messages on the downlink control channel, wherein the control messages are commands for changing the transmit power of the UE; and via the radio interface, send, to the node, reports indicating a parameter affected by the control messages, wherein the parameter indicated by the reports is the currently applied transmit power of the UE, wherein the node is configured to evaluate the parameters indicated in the received reports and determine the channel quality of the downlink control channel based on the evaluation.

28. The UE according to claim 27, wherein the at least one processor is configured to:
  perform measurements on radio resources which are potentially subject to interference from a further cell of the mobile network; and
  determine the channel quality of the downlink control channel on the basis of the performed measurements.

29. A method performed by a node in a mobile network for controlling radio transmission in the mobile network, the method comprising:
  determining a channel quality of the downlink control channel for a user equipment, UE;
  comparing the determined channel quality of the downlink control channel to a threshold;
  scheduling at least one radio transmission on a data channel of the cell based on the comparison, wherein
  in response to the channel quality of the downlink channel being above the threshold, the at least one radio transmission is scheduled in radio resources which are potentially subject to interference from a further cell of the mobile network, and
  in response to the channel quality of the downlink control channel being below the threshold, the at least one radio transmission is scheduled in radio resources which are protected from interference from a further cell of the mobile network; and
  indicating, on the downlink control channel, radio resources allocated for the scheduled at least one radio transmission.

* * * * *